US012811814B2

(12) United States Patent
Wu et al.

(10) Patent No.: US 12,811,814 B2
(45) Date of Patent: Nov. 24, 2026

(54) USER VERIFICATION HOOKS FOR A DECENTRALIZED EXCHANGE

(71) Applicant: Coinbase, Inc., Oakland, CA (US)

(72) Inventors: Qi Wu, Orchard (SG); Brock Miller, New York City, NY (US)

( * ) Notice: Subject to any disclaimer, the term of this patent is extended or adjusted under 35 U.S.C. 154(b) by 106 days.

(21) Appl. No.: 18/661,464

(22) Filed: May 10, 2024

(65) Prior Publication Data

US 2025/0350481 A1 Nov. 13, 2025

(51) Int. Cl.
*H04L 9/32* (2006.01)
*H04L 9/00* (2022.01)

(52) U.S. Cl.
CPC . *H04L 9/50* (2022.05); *H04L 9/32* (2013.01)

(58) Field of Classification Search
CPC .................................... H04L 9/50; H04L 9/32
See application file for complete search history.

(56) References Cited

U.S. PATENT DOCUMENTS

| | | | | |
|---|---|---|---|---|
| 9,800,559 | B2 * | 10/2017 | Roth | H04L 47/70 |
| 10,176,344 | B2 * | 1/2019 | Smith | G06F 21/566 |
| 11,810,104 | B1 * | 11/2023 | Benavides | G06Q 20/3678 |
| 11,861,609 | B2 | 1/2024 | Madisetti et al. | |
| 2017/0353309 | A1 * | 12/2017 | Gray | G06F 21/51 |
| 2020/0120023 | A1 * | 4/2020 | Munson | G06F 21/602 |
| 2021/0073913 | A1 * | 3/2021 | Ingargiola | H04L 63/12 |
| 2022/0076334 | A1 * | 3/2022 | Filter | G06Q 30/0185 |
| 2022/0210061 | A1 * | 6/2022 | Simu | G06F 21/10 |
| 2023/0117941 | A1 * | 4/2023 | Dupont | G06Q 40/06<br>705/36 R |
| 2023/0141423 | A1 * | 5/2023 | Fantini | G06Q 20/065<br>705/37 |
| 2023/0269093 | A1 * | 8/2023 | Ben-Ari | G06F 21/57<br>713/175 |
| 2024/0046370 | A1 * | 2/2024 | ElMessiry | G06Q 20/0658 |

(Continued)

OTHER PUBLICATIONS

William Entriken et al: "EIP 721:ERC-721 Non-Fungible Token Standard", Ethereum Improvement Proposals, No. 721, Jan. 24, 2018 (Jan. 24, 2018), XP055723345, https://github.com/ethereum/eips Retrieved from the Internet:URL: https://eips.ethereum.org/EIPS/eip-721 [retrieved on Aug. 18, 2020].

(Continued)

*Primary Examiner* — Lynn D Feild
*Assistant Examiner* — Vladimir I Gavrilenko
(74) *Attorney, Agent, or Firm* — Holland & Hart LLP

(57) ABSTRACT

Methods, systems, and devices for data management are described. A client application may receive an input to perform an action at a decentralized exchange. The client application may broadcast, via a blockchain network, messages configured to cause smart contracts on the blockchain network called by the decentralized exchange to verify whether a blockchain address associated with the input is authorized to perform the action at the decentralized exchange. In some examples, verifying may include checking a status managed by an entity different from the decentralized exchange. The smart contracts may perform the action after verifying that the blockchain address is authorized to perform the action, or the smart contracts may fail to perform the action after failing to verify that the blockchain address is authorized to perform the action.

20 Claims, 10 Drawing Sheets

(56) References Cited

U.S. PATENT DOCUMENTS

| | | | | |
|---|---|---|---|---|
| 2024/0257242 | A1* | 8/2024 | Cohen | G06Q 40/04 |
| 2025/0117849 | A1* | 4/2025 | Yim | G06Q 40/04 |
| 2025/0278756 | A1* | 9/2025 | Shila Chew | G06Q 30/0226 |

OTHER PUBLICATIONS

Mas et al: "Project Guardian—Open and Interoperable Networks",https://www.mas.gov.sg/publications/monogr aphs-or-information-paper/2023/project-gua rdian-open-interoperable-networks,Jun. 26, 2023 (Jun. 26, 2023), pp. 1-46, XP093239555,Retrieved from the Internet:URL:https://www.mas.gov.sg/-/media/mas-med ia-library/development/fintech/project-gua rdian/project-guardian-open-interoperable-network.pdf p. 25-p. 30.

"International Search Report and Written Opinion of the International Searching Authority," issued in connection with Int'l Appl. No. PCT/US2025/024740, dated Jul. 1, 2025 (13 pages).

* cited by examiner

USER VERIFICATION HOOKS FOR A DECENTRALIZED EXCHANGE

FIELD OF TECHNOLOGY

The present disclosure relates generally to data management, including techniques for user verification hooks for a decentralized exchange.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

Figure 1:
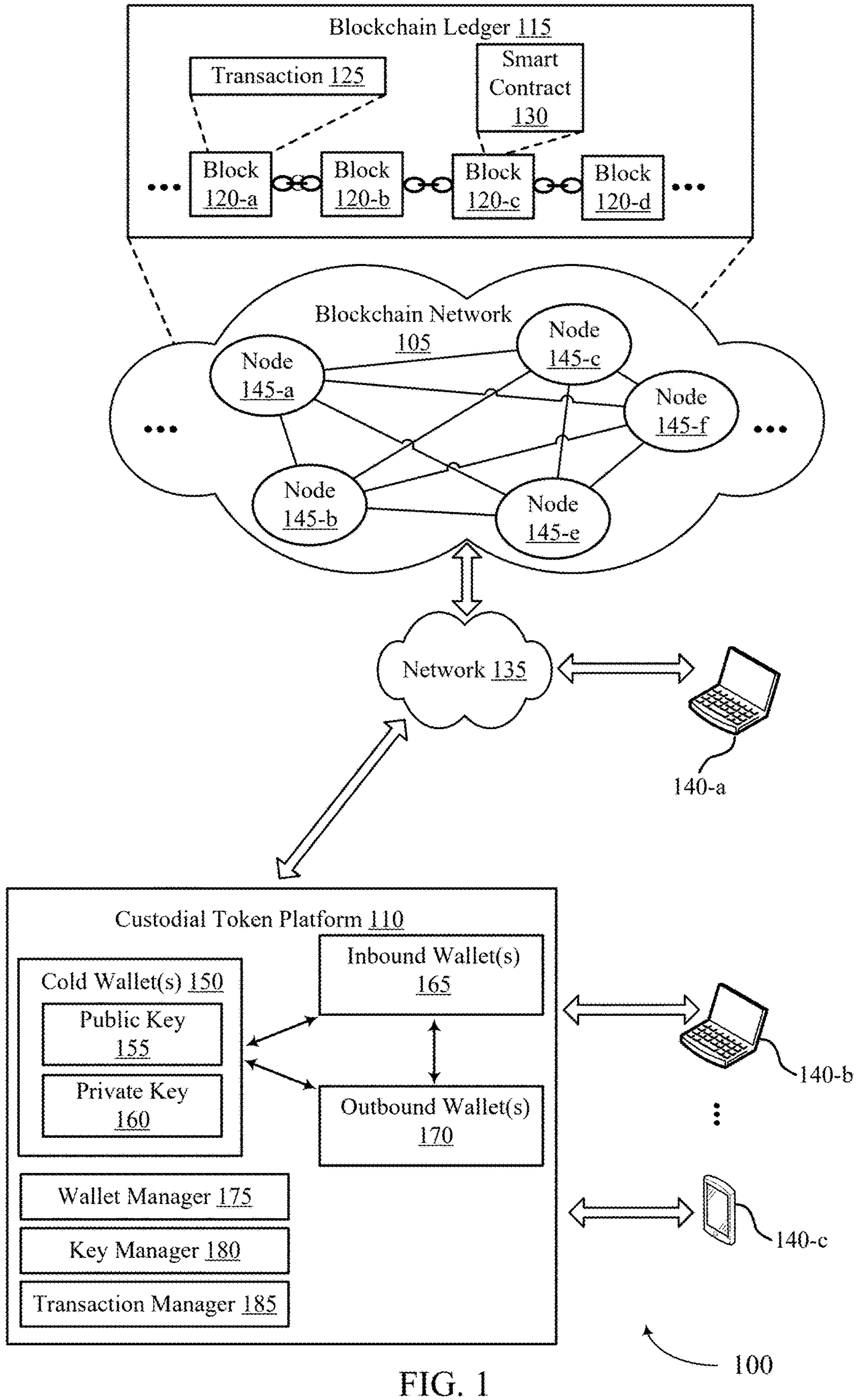
FIGS. 1 and 2 show examples of computing environments that support user verification hooks for a decentralized exchange in accordance with aspects of the present disclosure.

Blockchain networks may support or include decentralized exchanges (DEXs) that utilize liquidity pools. For example, a liquidity pool may be an example of a smart contract containing an amount (i.e., a "pool") of two or more crypto tokens. Users of a blockchain network associated with the decentralized exchange may trade, buy, or sell crypto tokens via the liquidity pool without finding a buyer or seller (e.g., automatically, without a third-party, etc.). As an example, a user may trade an amount of a first crypto token for an amount of a second crypto token via the liquidity pool. An algorithm of the liquidity pool, such as an automated market maker (AMM) algorithm, may determine an exchange rate between the first crypto token and the second crypto token. Additionally, users may contribute liquidity to the liquidity pool. For example, a user may add or supply crypto tokens to the liquidity pool and receive, based on contributing the liquidity, a portion of fees. That is, transactions on the liquidity pool may be associated with a transaction fee, and users contributing liquidity (e.g., liquidity providers) may receive, in exchange for contributing the liquidity, a portion of the transaction fees. For example, the portion of transaction fees received by the user may be proportional to an amount of liquidity added to the liquidity pool.

Leveraging smart contracts to automatically execute transactions without a third-party via a liquidity pool may simplify a user experience related to trading, buying, or selling crypto tokens and may limit or remove counterparty risk associated with other types of exchanges (e.g., centralized or custodial exchanges). However, some users may refrain from interacting with liquidity pools based on a regulation compliance. For example, users of the blockchain network may perform transactions via a blockchain address, which, while protecting an identity of the user, may not enable regulation compliance. That is, an institution required to comply with one or more regulations may not contribute liquidity to the liquidity pool or otherwise interact with the liquidity pool without assurance that users interacting with the liquidity pool meet the regulations. As an example, the institution may receive some assurance that the users interacting with the liquidity pool are not sanctioned individuals.

As described herein, a client application may support compliance for institutions while also providing advantages of decentralized exchanges (e.g., protecting user identity, reduction of counterparty risk). For example, a client application may broadcast messages via a blockchain network to verify whether a blockchain address is authorized to perform an action at a decentralized exchange, such as initialize a liquidity pool, add liquidity to a liquidity pool, remove liquidity from a liquidity pool, or exchange tokens via a liquidity pool. Verifying whether the blockchain address is authorized to perform the action may involve checking a status of the blockchain address at another entity (e.g., another exchange or entity that has access to or manages user data associated with the blockchain address). For example, the other entity may store or have access to information associated with users of blockchain addresses such that the entity may check whether the blockchain address is authorized to perform the action without revealing information about a user of the blockchain address. In other words, the entity may check a trade eligibility and compliance for a blockchain address. The one or more messages may also cause smart contracts to either perform the action or fail to perform the action according to whether the blockchain address is authorized. That is, the smart contracts may perform the action after verifying that the blockchain address is authorized, or refrain from performing the action after failing to verify that the blockchain address is authorized.

FIG. 1 illustrates an example of a computing environment 100 that supports user verification hooks for a decentralized exchange in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a sub-program that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the custodial token platform 110, the blockchain network 105, or both. For example, a user of the computing device 140-*a* may provide user inputs via the computing device 140-*a*, which may result in commands, data, or any combination thereof being communicated via the network 135 to the custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital assets between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to an external wallet, to deploy a smart contract (e.g., a self-executing program), or to call a smart contract.

The blockchain network 105 may support or include DEXs, liquidity pools, and smart contracts. For example, a liquidity pool may be an example of or include a smart contract 130 which contains an amount (i.e., a "pool") of two or more crypto tokens. The liquidity pool may enable users of the blockchain network 105 to exchange crypto tokens automatically via the smart contract 130. For example, the smart contract 130 of the DEX may execute an exchange of a first amount of a first crypto token for a second amount of a second crypto token according to a determined (e.g., via an algorithm) rate of exchange. Additionally, users may supply crypto tokens, such as add liquidity to, the liquidity pool. For example, users may supply the crypto tokens to the liquidity pool in exchange for a portion of transaction fees associated with transactions of the liquidity pool, where the portion is based on a proportion of crypto tokens in the liquidity pool supplied by a given user.

In some examples described herein, a decentralized exchange associated with the liquidity pool and a client application may support verified access to a liquidity pool. For example, a client application may broadcast messages via the blockchain network 105 configured to cause smart contracts to verify whether a blockchain address is authorized to perform an action at a liquidity pool of the decentralized exchange. In some examples, a smart contract, to verify whether the blockchain address is authorized, may access or otherwise obtain information associated with blockchain addresses and managed by an exchange (e.g., the custodial token platform 110), such as by accessing attestation records associated with the blockchain address. That is, the smart contract may check whether a blockchain address is associated with an attestation (e.g., on the blockchain ledger 115) and, based on the blockchain address being associated with the attestation, indicate to another smart contract that the blockchain address is verified to perform the action.

Figure 2:
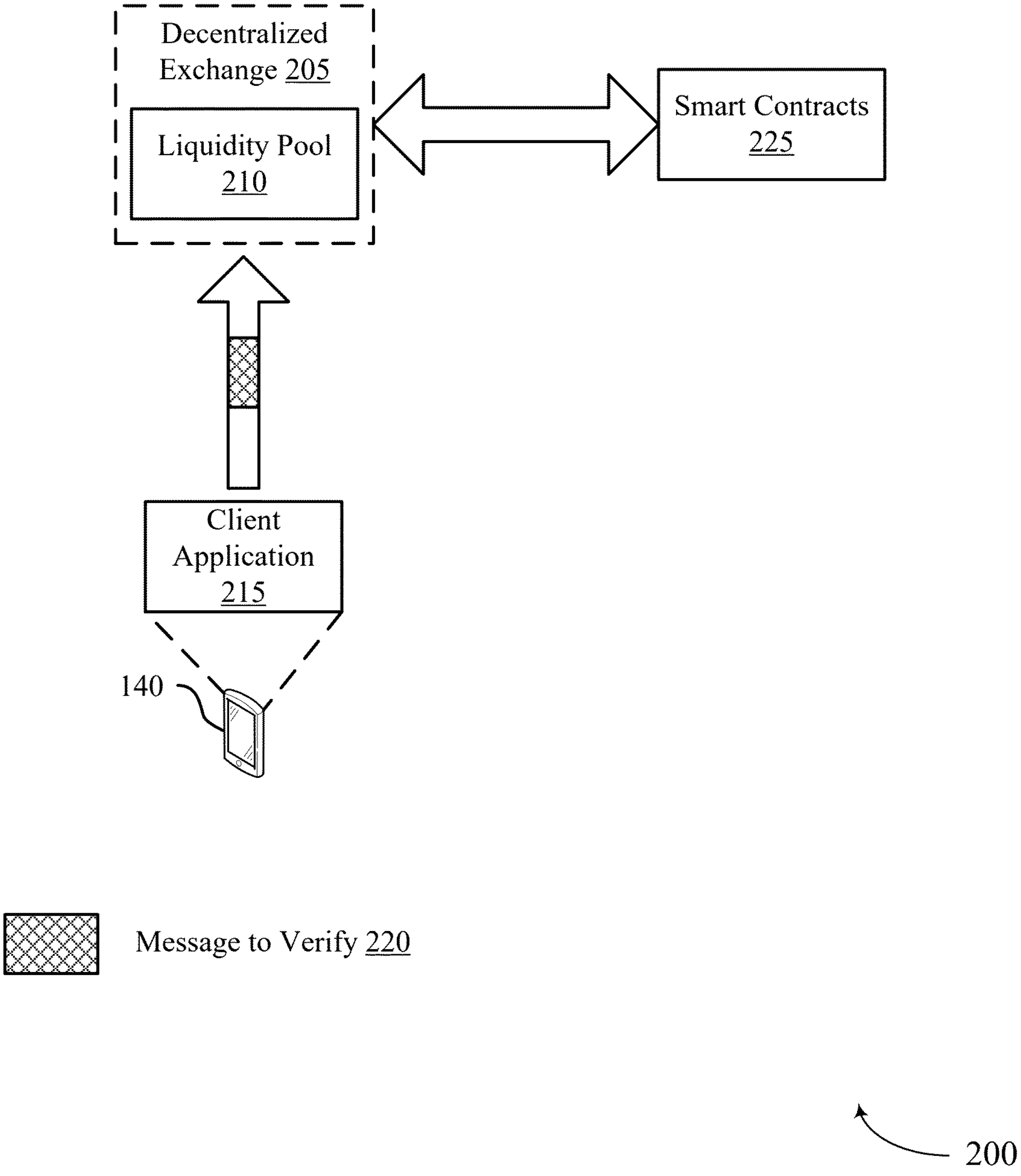

FIG. 2 shows an example of a computing environment 200 that supports user verification hooks for a decentralized exchange in accordance with aspects of the present disclosure. The computing environment 200 may include a computing device 140, which may be an example of the computing devices 140 as described with reference to FIG. 1. The computing environment 200 may also include a client application 215, which may be supported by or implemented by a custodial token platform 110 or another system or service as described with reference to FIG. 1. Additionally, the computing environment 200 may include a decentralized exchange 205 and smart contracts 225, which may be on a blockchain network, such as the blockchain network 105 as described with reference to FIG. 1. It should be noted that the decentralized exchange 205 may be supported or implemented by one or more other smart contracts, such as the smart contract 130 described with respect to FIG. 1.

The client application 215 may receive an input to perform an action at the decentralized exchange 205. For example, the client application 215 may be at the computing device 140, and the client application 215 may receive the input via a user interface of the client application 215 on the computing device 140. The input may be an example of the input to initialize the pool or the input to interact with the liquidity pool as described with reference to FIGS. 3 and 4, respectively. The input may be associated with a blockchain address. For example, the blockchain address may be a self-custodial (e.g., self-custody) blockchain address, a semi-custodial blockchain address, or a non-custodial blockchain address. That is, the blockchain address may be associated with one or more keys managed by a user (e.g., a user of the client application 215), managed (e.g., fully or partially) by a custodial token platform, such as the custodial token platform 110 as described with reference to FIG. 1, or managed by another wallet service (e.g., fully or partially).

The action may be an action at the liquidity pool 210 of the decentralized exchange 205. For example, the action may be to initialize (e.g., provision) the liquidity pool 210, which may be described in greater detail elsewhere herein, including with reference to FIG. 3. Additionally, or alternatively, the action may be to trade a first crypto token for a second crypto token (e.g., swap) via the liquidity pool 210, add liquidity to the liquidity pool 210, or remove liquidity from the liquidity pool 210, which may be described in greater detail elsewhere herein, including with reference to FIG. 4.

The client application 215 may, in response to receiving the input to perform the action at the decentralized exchange 205, broadcast or cause broadcast of one or more messages via a blockchain network, such as the blockchain network 105 as described with reference to FIG. 1. For example, the one or more messages may be configured to cause smart contracts 225 on the blockchain network to verify whether the blockchain address associated with the input is authorized to perform the action at the decentralized exchange 205. In some examples, a smart contract associated with the client application 215 (e.g., a router) may receive the input and broadcast the one or more messages to a smart contract associated with the liquidity pool 210 at the decentralized exchange 205 (e.g., a liquidity pool manager). The smart contract associated with the liquidity pool 210 may call the smart contracts 225 to perform the verification. For example, the smart contracts 225 may include a hook contract, a policy, an indexing contract, a registry contract, a sanction list, a whitelisted address list, or any combination thereof.

The smart contracts 225 may be associated with the client application 215, the decentralized exchange 205, and/or an exchange (e.g., the custodial token platform 110) different than the decentralized exchange 205. For example, the smart contracts 225 may include one or more smart contracts configured at the decentralized exchange 205 including pre-hook functions (e.g., pre-hook contracts) to check whether the blockchain address is authorized to perform the action and/or post-hook functions (e.g., post-hook contracts) to, in some examples, collect fees after the action is performed.

The pre-hook functions configured by the decentralized exchange may check whether the blockchain address is associated with attestations associated with an eligibility to perform the action. For example, the attestations may include a know-your-customer (KYC) check, a geographic location, a citizenship, or the like. In some examples, the attestations may be issued via the client application 215 or a custodial token platform associated with the client application 215. The pre-hook function may reference a mapping on the blockchain network (e.g., via one or more of the smart contracts 225) to verify whether an attestation is associated with the blockchain address. For example, the client application 215 or the custodial token platform may broadcast messages to the blockchain network configured to store a mapping of an issued attestation to the blockchain address, which the pre-hook function may later reference or call to verify whether the blockchain address is authorized to perform the action. Additionally, or alternatively, the pre-hook functions may check whether the blockchain address is included in a sanctions list, such as a public sanctions list associated with a regulatory body. In some examples, the pre-hook functions may check whether the blockchain address is a whitelisted address, such as in an example in which the action includes initializing the liquidity pool 210.

The decentralized exchange 205 may include one or more smart contracts including logic to perform the action after the verification is complete. For example, the one or more smart contracts supported by or supporting the decentralized exchange 205 may initialize the liquidity pool 210, exchange a first crypto token for a second crypto token, add liquidity to the liquidity pool 210, or remove liquidity from the liquidity pool 210 based on the one or more smart contracts 225 verifying that the blockchain address is authorized to perform the action. Or, the one or more smart contracts supported by or supporting the decentralized exchange 205 may fail to perform the action based on the one or more smart contracts 225 failing to verify that the blockchain address is authorized to perform the action.

Accordingly, the decentralized exchange 205, the liquidity pool 210, or both, may be configured with pre-hook and/or post-hook functions such that the decentralized exchange 205 is configured to call the pre-hook and/or post-hook function in response to a message that is configured to perform an action at the decentralized exchanged. The pre-hook and/or post-hook functions may be configured via identifiers (e.g., contract addresses, function address) on the blockchain network and these functions may be supported by the one or more smart contracts 225.

Figure 3:
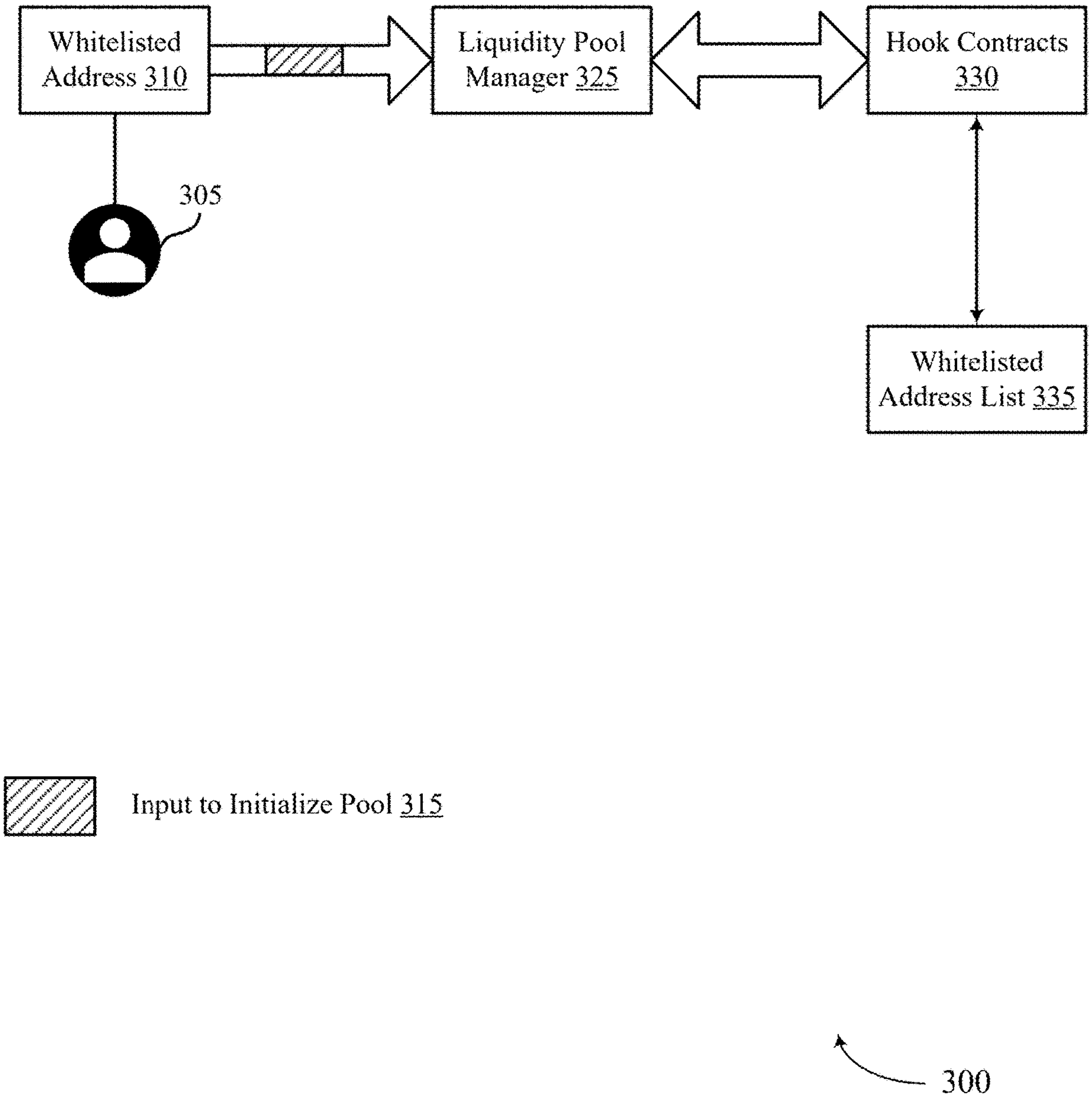
FIGS. 3 and 4 show examples of smart contract flows that support user verification hooks for a decentralized exchange in accordance with aspects of the present disclosure.

FIG. 3 shows an example of a smart contract flow 300 that supports user verification hooks for a decentralized exchange in accordance with aspects of the present disclosure. The smart contract flow 300 may include multiple smart contracts and a decentralized exchange, which may be corresponding systems and devices described with reference to FIG. 2. For example, the smart contract flow 300 includes multiple smart contracts supported by a blockchain network such as a liquidity pool manager 325 and one or more hook contracts 330.

A user 305, such as a user of a client application, may provide inputs to the client application. For example, the client application may receive inputs from the user 305, where the inputs are associated with a blockchain address of the user. In the example of FIG. 3, the user 305 may be an administrator of the client application such that the blockchain address associated with the user 305 is a whitelisted address 310. In the example of FIG. 3, the client application is an example of an administrator page of the custodial token platform 110 of FIG. 1.

For example, the user 305 may provide an input to initialize a pool 315 to the liquidity pool manager 325 (e.g., via the administrator page), where the input is associated with the whitelisted address 310. The whitelisted address 310 may initialize the pool by calling an initialize function in the liquidity pool manager 325. The call may indicate metadata associated with the pool and one or more parameters of the pool to be initialized. For example, the one or more parameters may include a first crypto token, a second crypto token, a fee, and one or more hook contracts. The one or more hook contracts may be examples of hook contracts described in greater detail elsewhere herein, including with reference to FIG. 4.

Before initializing the pool, the liquidity pool manager 325 may call hook contracts 330. For example, the liquidity pool manager 325 may call a before-initialize function in the hook contracts 330. The hook contracts 330 may verify whether a blockchain address requesting to initialize the pool is associated with a permission to initialize pools. For example, the hook contracts 330 may verify whether the whitelisted address 310 is included on a whitelisted address list 335, which may be managed by or accessible by the one or more hook contracts 330. Additionally, the hook contracts 330 may verify whether the input to initialize the pool 315 was received via the liquidity pool manager 325 (e.g., rather than a different smart contract).

In some examples, the hook contracts 330 may fail to verify that a blockchain address requesting to initialize the pool is associated with the permission, fail to verify that the input to initialize the pool 315 was received via the liquidity pool manager 325, or both. In such examples, the liquidity pool manager 325 may refrain from initializing the pool in response to this failure to verify the blockchain address.

Alternatively, the hook contracts 330 may verify that the whitelisted address 310 is included in the whitelisted address list 335 and that the input to initialize the pool 315 was received via the liquidity pool manager 325. After the hook contracts 330 perform the verification, the liquidity pool manager 325 may initialize the liquidity pool. For example, the liquidity pool manager 325 may create or provision the liquidity pool according to the indicated one or more parameters. Creation or provisioning of the liquidity pool may include calling one or more smart contracts associated with or supporting the decentralized exchange.

In some examples, an administrator address (e.g., owner, default administrator) of the hook contracts 330 may provide inputs to add or remove whitelisted addresses to the whitelisted address list 335. That is, the whitelisted address 310 may be designated by an administrator with a capability to edit the whitelisted address list 335.

Figure 4:
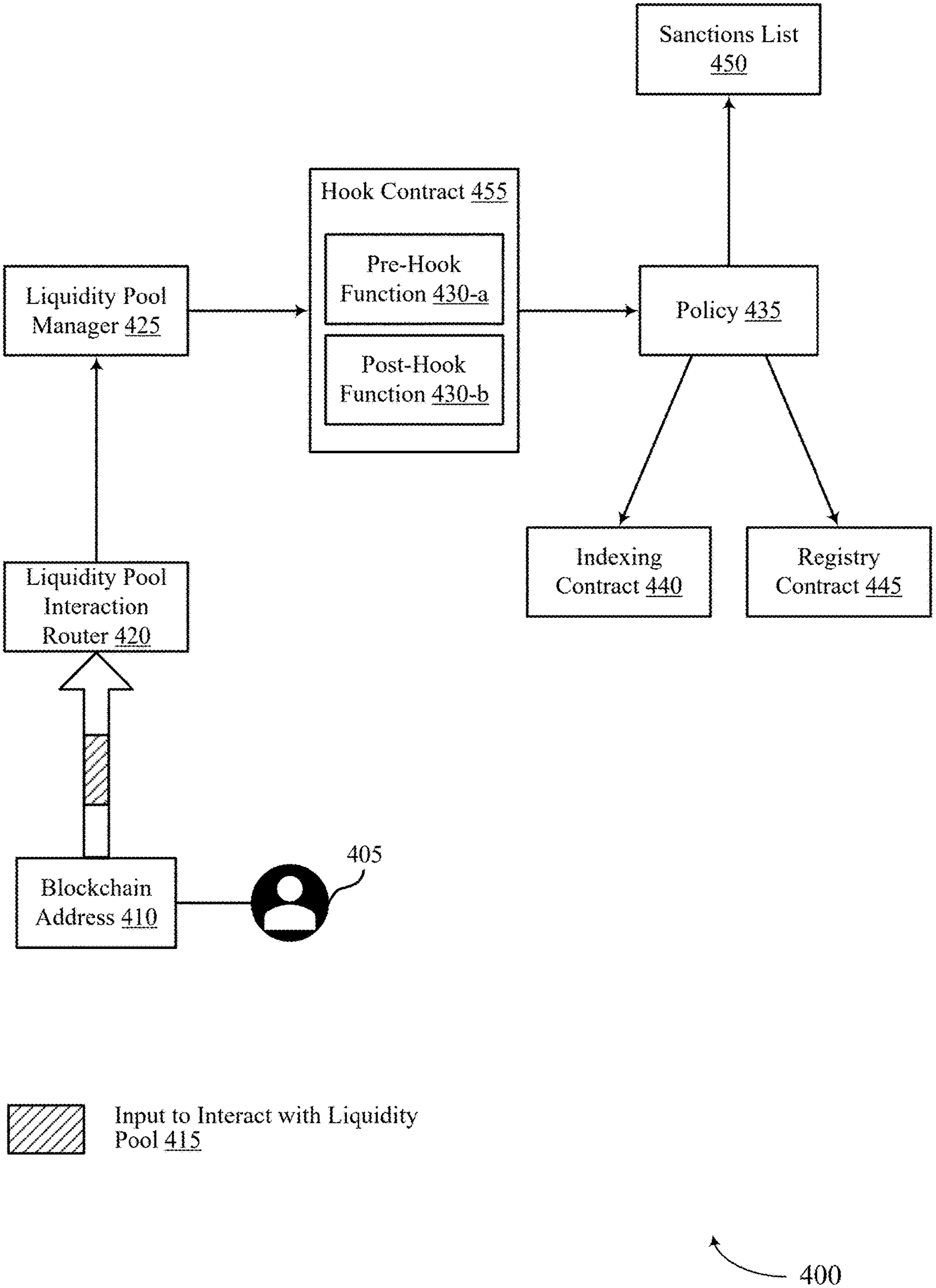

FIG. 4 shows an example of a smart contract flow 400 that supports user verification hooks for a decentralized exchange in accordance with aspects of the present disclosure. The smart contract flow 400 may include multiple smart contracts of a client application and a decentralized exchange, which may be corresponding systems and devices described with reference to FIG. 2.

A user 405, such as a user of a client application, may provide inputs to the client application. For example, the client application may receive inputs from the user 405, where the inputs are associated with a blockchain address 410 of the user. In the example of FIG. 4, the user 405 may provide an input to interact with a liquidity pool 415 to the client application via the blockchain address 410. The input to interact with the liquidity pool 415 may be an input to trade a first crypto token for a second crypto token, to add liquidity, or to remove liquidity.

The user 405 may provide an input to interact with a liquidity pool 415 to the client application, where the input is associated with the blockchain address 410. In some examples, the client application may route the input to interact with a liquidity pool 415 to a smart contract of the client application (e.g., a backend), such as a liquidity pool interaction router 420. The liquidity pool interaction router 420, based on receiving the input to interact with a liquidity pool 415, may acquire an unlock from a liquidity pool manager 425. For example, the liquidity pool interaction router 420 may transmit a request for an unlock to the liquidity pool manager 425. In other words, the liquidity pool interaction router 420 may call an unlock function of the liquidity pool manager 425. The liquidity pool manager 425 may transmit, to the liquidity pool interaction router 420, a response to the request indicating that the unlock is acquired. The liquidity pool manager 425 may be an example of a smart contract associated with or supporting a DEX, as described herein.

In a first example, the input may be to trade a first crypto token for a second crypto token. In such examples, the liquidity pool interaction router 420 may be a swap router. For example, the swap router may be a smart contract associated with the client application (e.g., a smart contract managed by the custodial token platform) which receives requests to trade a crypto token for another crypto token via a liquidity pool. The swap router may, after acquiring the unlock, call a swap function at the liquidity pool manager 425. For example, the swap router may call the swap function, where the call includes information about the trade to be made via the liquidity pool, such as an amount of a first crypto token to be traded for a second crypto token. The call may include additional information, such as the blockchain address 410 from which the request was initiated.

Before executing the swap, the liquidity pool manager 425 may call a pre-hook function 430-*a* of a hook function 430. That is, the hook contract 455 may include the pre-hook function 430-*a* and a post-hook function 430-*b*. In other words, the pre-hook function 430-*a* and the post-hook function 430-*b* may represent respective portions of a same smart contract. Alternatively, the pre-hook function 430-*a* and the post-hook function 430-*b* may be functions of different smart contracts. The pre-hook function 430-*a* (e.g., beforeSwap) may validate whether the blockchain address 410 is authorized to perform the swap. For example, the pre-hook function 430-*a* may check whether the input to interact with the liquidity pool 415 was received by the swap router. Additionally, the pre-hook function 430-*a* may call a policy 435, such as a policy contract, to verify whether the blockchain address 410 is authorized to perform the swap according to the policy 435.

The policy 435 may be configured to verify whether the blockchain address 410 is associated with one or more attestations required to perform the swap. For example, the policy 435 may call an indexing contract 440 to retrieve an attestation identifier according to the blockchain address 410. After retrieving the attestation identifier, the policy 435 may check that the attestation identifier is currently associated with the blockchain address 410 (e.g., has not been revoked) via a registry contract 445. Additionally, or alternatively, the policy 435 may verify whether the blockchain address 410 is included on the sanctions list 450.

After verifying that the blockchain address 410 satisfies the policy 435 and that the input to interact with the liquidity pool 415 is received by the swap router of the client application, the liquidity pool manager 425 may execute the swap (e.g., execute a swap function of the liquidity pool manager 425 contract). That is, the liquidity pool manager 425 may transfer an amount of a second crypto token to the blockchain address 410, transfer an amount of a first crypto token to the liquidity pool, and collect a fee from the blockchain address 410 associated with the swap (e.g., a liquidity pool fee). In some examples, the liquidity pool manager may collect a protocol fee in addition to or alternatively from a swap fee (e.g., distributed to the liquidity providers).

In some examples, the post-hook function 430-*b* may be configured to collect a fee after the liquidity pool manager 425 executes the swap. For example, the post-hook function 430-*b* (e.g., afterSwap) may be configured by the custodial token platform, and the fee may be associated with performing the swap via the client application associated with the custodial token platform. That is, the post-hook function 430-*b* may collect, from the amount of the second crypto token transferred to the blockchain address 410, the fee associated with performing the swap via the client application in addition to or alternatively from the liquidity pool fee. The liquidity pool manager 425 may store the fee. In some examples, the fee may be collected from the liquidity pool manager 425, such as by a fee manager (e.g., a blockchain address of a fee manager). For example, a fee manager may call the hook contract 455 to withdraw the fees, where the call may specify a crypto token, a recipient address, or both. The hook contract 455 may verify that the fee manager is associated with the blockchain address of the fee manager, acquire an unlock from the liquidity pool manager 425, and transfer the fees to the recipient address.

In a second example, the input may be to add liquidity to the liquidity pool. In such examples, the liquidity pool interaction router 420 may be a liquidity pool router. For example, the liquidity pool router may be a smart contract of the client application which receives requests to add liquidity to or remove liquidity from a liquidity pool. The liquidity pool router may, after acquiring the unlock, call a modify position function at the liquidity pool manager 425. For example, the liquidity pool router may call the modify position function, where the call includes information about the amount of liquidity to be added to the liquidity pool (e.g., a positive liquidity), such as an amount of a first crypto token, a second crypto token, or both.

Before adding the liquidity, the liquidity pool manager 425 may call the pre-hook function 430-*a* (e.g., beforeAddLiquidity) of the hook contract 455. The pre-hook function 430-*a* may validate whether the blockchain address 410 is authorized to add liquidity to the liquidity pool. For example, the pre-hook function 430-*a* may check whether the input to interact with the liquidity pool 415 was received by the liquidity pool router. Additionally, the pre-hook function 430-*a* may call a policy 435, such as a policy contract, to verify whether the blockchain address 410 is authorized to add the liquidity according to the policy 435.

The policy 435 may be configured to verify whether the blockchain address 410 is associated with one or more attestations required to add the liquidity. For example, the policy 435 may call the indexing contract 440 to retrieve an attestation identifier according to the blockchain address 410. After retrieving the attestation identifier, the policy 435 may check that the attestation identifier is currently associated with the blockchain address 410 (e.g., has not been revoked) via the registry contract 445. Additionally, or alternatively, the policy 435 may verify whether the blockchain address 410 is included on the sanctions list 450.

After verifying that the blockchain address 410 satisfies the policy 435 and that the input to interact with the liquidity pool 415 is received by the liquidity pool router of the client application, the liquidity pool manager 425 may modify the position of the blockchain address 410 by adding an amount of liquidity associated with the blockchain address 410 to the liquidity pool. That is, the liquidity pool manager 425 may add an amount of liquidity to the liquidity pool and modify a proportion of liquidity in the liquidity pool (e.g., a position) contributed by the blockchain address 410. For example, the liquidity pool manager 425 may modify or update the position such that the blockchain address 410 may receive a portion of liquidity pool fees proportional to the updated amount of liquidity contributed (e.g., after adding the liquidity). In some examples, the user 405 may contribute liquidity to the liquidity pool without modifying a position. In other words, the user 405 may donate liquidity to the liquidity pool. In such examples, the liquidity pool manager 425 may add the amount of liquidity to the liquidity pool without modifying or updating a position of the blockchain address.

The liquidity pool manager 425 may issue tokens to the blockchain address 410 based on the modified position. As an example, the liquidity pool manager 425 may issue a liquidity provider token (e.g., or an NFT) to the blockchain address 410. In some examples, the liquidity pool manager 425 may issue the liquidity provider token to the blockchain address 410 after verifying that the blockchain address 410 is authorized to receive a liquidity provider token. For example, the liquidity pool manager 425 may call the hook contract 455 to verify the blockchain address 410 prior to issuing the liquidity provider token.

In a third example, the input may be to remove liquidity from the liquidity pool. As described herein, removing liquidity from the liquidity pool may refer to removing an amount of liquidity associated with a user in the liquidity pool. As an example, a user may remove a portion of liquidity or all liquidity from the liquidity pool. In such examples, the liquidity pool interaction router 420 may be the liquidity pool router. The liquidity pool router may, after acquiring the unlock, call a modify position function at the liquidity pool manager 425. For example, the liquidity pool router may call the modify position function, where the call includes information about the amount of liquidity to be removed from the liquidity pool (e.g., a negative liquidity), such as an amount of a first crypto token, a second crypto token, or both.

Before removing the liquidity, the liquidity pool manager 425 may call the pre-hook function 430-*a* (e.g., beforeRemoveLiquidity) of the hook contract 455. The pre-hook function 430-*a* may validate whether the blockchain address 410 is authorized to remove liquidity from the liquidity pool. For example, the pre-hook function 430-*a* may check whether the input to interact with the liquidity pool 415 was received by the liquidity pool router. Additionally, the pre-hook function 430-*a* may call a policy 435, such as a policy contract, to verify whether the blockchain address 410 is authorized to remove the liquidity according to the policy 435.

The policy 435 may verify whether the blockchain address 410 is included on the sanctions list 450. For example, the policy 435 associated with removing the liquidity from the liquidity pool may not be associated with one or more attestations, and the policy 435 may not call the indexing contract 440 and the registry contract 445 in the example of removing liquidity.

After verifying that the blockchain address 410 satisfies the policy 435 (e.g., is not included on the sanctions list 450) and that the input to interact with the liquidity pool 415 is received by the liquidity pool router of the client application, the liquidity pool manager 425 may modify the position of the blockchain address 410 by removing an amount of liquidity associated with the blockchain address 410 to the liquidity pool. That is, the liquidity pool manager 425 may remove an amount of liquidity to the liquidity pool and modify a proportion of liquidity in the liquidity pool (e.g., a position) contributed by the blockchain address 410. For example, the liquidity pool manager 425 may modify or update the position such that the blockchain address 410 may receive a portion of liquidity pool fees proportional to the updated amount of liquidity contributed (e.g., after removing the liquidity).

Some of the techniques described herein with reference to FIGS. 2 through 4 describe various smart contracts (e.g., liquidity pool interaction router 420, liquidity pool manager 425, hook contract 455, policy 435, indexing contract 440, registry contract 445) sending information to and receiving information from other smart contracts or sources, but it should be understood that transmission of a function call to another smart contract may be performed via a broadcasting of one or more messages (e.g., bundled calls) via a blockchain network rather than direct communication between smart contracts.

Figure 5:
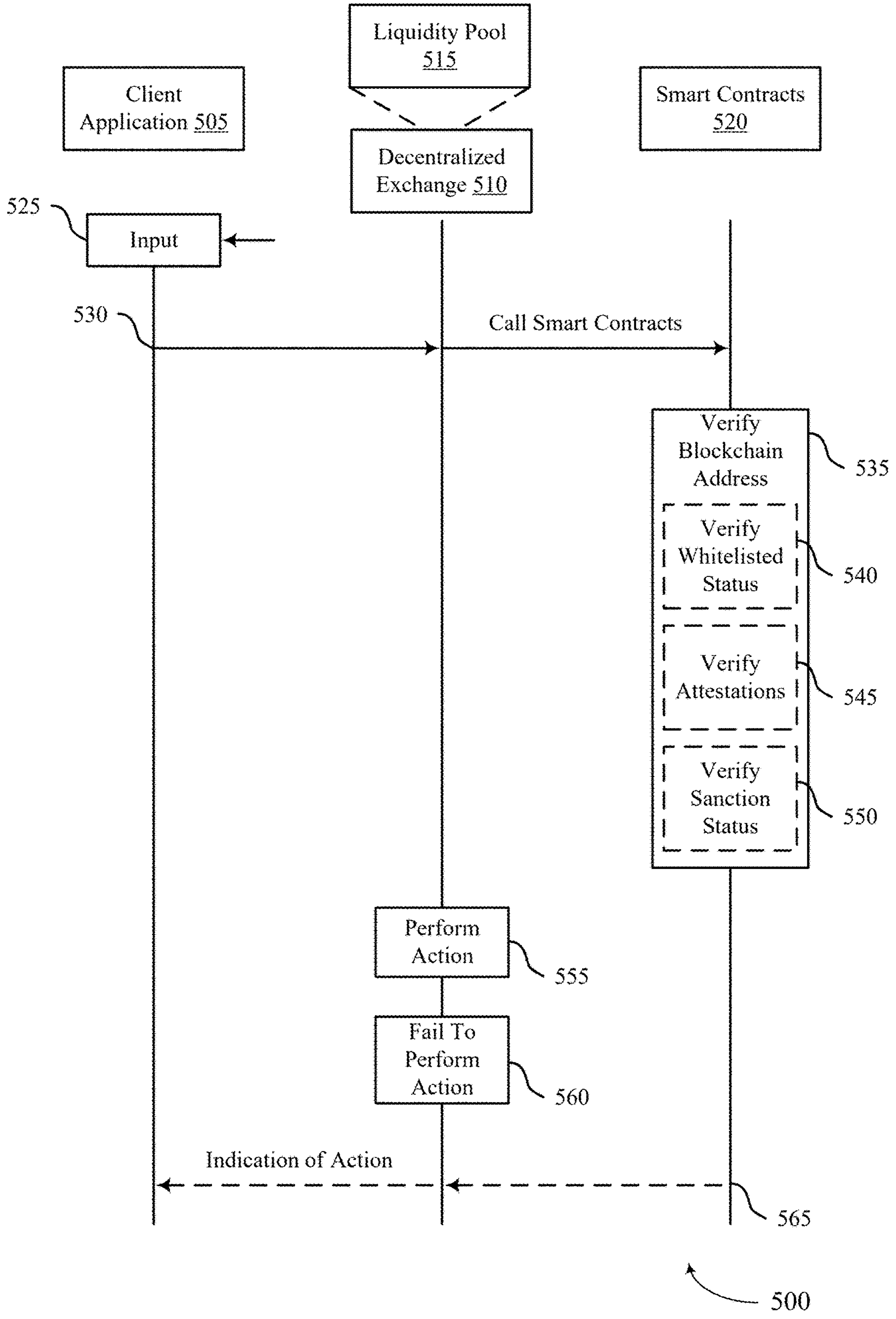
FIG. 5 shows an example of a process flow that supports user verification hooks for a decentralized exchange in accordance with aspects of the present disclosure.

FIG. 5 shows an example of a process flow 500 that supports user verification hooks for a decentralized exchange in accordance with aspects of the present disclosure. In some examples, the process flow 500 may implement or be implemented by aspects of the computing environment 100, the computing environment 200, the smart contract flow 300, and/or the smart contract flow 400 as described with reference to FIGS. 1 through 4. For example, the process flow 500 may include a client application 505, a decentralized exchange 510, a liquidity pool 515, and smart contracts 520, which may be examples of the corresponding devices as described with reference to FIGS. 2-4. As described herein, the decentralized exchange 510, the liquidity pool, or both, may be supported by or associated with one or more smart contracts.

Alternative examples of the following may be implemented, where some steps are performed in a different order than described or are not performed at all. In some cases, steps may include additional features not mentioned below, or further steps may be added. Although the client application 505, the decentralized exchange 510, the liquidity pool 515, and the smart contracts 520, are shown performing the steps of the process flow 500, some aspects of some operations may also be performed by one or more other components.

At 525, the client application 505 may receive an input. For example, the client application 505 may receive an input to perform an action at the decentralized exchange 510. The input may be an example of the input to initialize the pool 315 or the input to interact with the liquidity pool 415 as described with reference to FIGS. 3 and 4, respectively. The input may be associated with a blockchain address, such as the whitelisted address 310 or the blockchain address 410 as described with reference to FIGS. 3 and 4, respectively. In some examples, the blockchain address may be an example of a self-custody blockchain address. For example, the blockchain address may be a self-custody address associated with one or more keys managed by a different exchange (e.g., different than the decentralized exchange) or managed by a user.

At 530, the client application 505 may broadcast or cause broadcast of one or more messages via a blockchain network. For example, the client application 505 may broadcast one or more messages via the blockchain network configured to cause the smart contracts 520 to verify whether the blockchain address is authorized to perform the action at the decentralized exchange 510. For example, at 530, the one or more messages may call a function, at the decentralized exchange 510, associated with the action to be performed. The centralized exchange, before performing the action (e.g., executing the function for the action), may be configured to call the pre-hook function of a hook smart contract (e.g., one or more of the smart contracts 520) as described herein. The calling of the pre-hook function may result in one or more additional smart contracts being called to perform the verification At 535, the smart contracts 520 may verify the blockchain address. For example, verifying the blockchain address may include checking a status managed by an entity different from the decentralized exchange 510. The exchange may manage and verify information associated with statuses of blockchain addresses and may cause attestations for such information to be stored or accessible by one or more smart contracts 520 (e.g., an attestation contract. The exchange may be an example of the custodial token platform 110 as described with reference to FIG. 1.

In some examples, verifying the blockchain address may include verifying a whitelisted status. For example, at 540, the smart contracts 520 may verify whether the blockchain address is whitelisted by calling a function that checks whether the address is on a whitelist. The smart contracts 520 may verify whether the blockchain address is whitelisted based on the action including initializing the liquidity pool 515. For example, in order to initialize the liquidity pool 515, the blockchain address may be whitelisted.

In some examples, verifying the blockchain address may include verifying attestations. For example, at 545, the smart contracts 520 may verify whether the blockchain address is associated with one or more attestations. The smart contracts 520 may verify whether the blockchain address is associated with the one or more attestations managed by the entity different from the decentralized exchange 510. For example, the exchange may provide or otherwise store attestations associated with users of the exchange. In other words, the exchange may issue and refresh (e.g., periodically) attestations for users. Issuing the attestations may refer to initial issuance, updates to the attestations, or both. One or more processes (e.g., off-chain processes) may update (e.g., synchronize) the user status from the exchange and make updates to the one or more attestations on the blockchain network. For example, verifying the blockchain address may be based on the one or more processes updating information associated with the attestations on the blockchain network.

The one or more attestations may be associated with an eligibility of the blockchain address. For example, the one or more attestations may include a KYC check, a geographic location, a citizenship, or any combination thereof. To verify whether the blockchain address is associated with the one or more attestations, the smart contracts 520 may reference a mapping between an attestation record and a blockchain address on the blockchain network.

The smart contracts 520 may include a policy contract associated with the liquidity pool 515, such as the policy 435 as described with reference to FIG. 4. The policy contract may indicate the one or more attestations associated with the eligibility of the blockchain address to interact with the liquidity pool 515. For example, the policy contract may indicate a KYC check, a geographic location, a citizenship, or the like, where the blockchain address may satisfy indicated requirements in order to interact with the liquidity pool 515.

In some examples, verifying the blockchain address may include verifying a sanction status. For example, at 550, the smart contracts 520 may verify whether the blockchain address is sanctioned. That is, the smart contracts 520 may check whether the blockchain address is listed on a sanction list to verify whether the blockchain address is authorized to perform the action. In some examples, the smart contracts 520 may check whether the blockchain address is listed on the sanction list based on the action being to remove liquidity from the liquidity pool 515. That is, the smart contracts 520 may check the sanction list and refrain from checking attestations and/or whitelisted statuses associated with the blockchain address before removing the liquidity from the liquidity pool 515.

At 555, the decentralized exchange 510 may perform the action. For example, the decentralized exchange 510 may perform the action (e.g., execute a function for the action) in response to, such as after or upon, the smart contracts 520 verifying that the blockchain address is authorized to perform the action at the decentralized exchange 510. The action may include initializing the liquidity pool 515, such as initializing the liquidity pool as described with reference to FIG. 3. For example, the decentralized exchange 510 may initialize the liquidity pool in response to the smart contracts 520 verifying that the blockchain address is whitelisted at 540.

In another example, the action may include an interaction with the liquidity pool 515 on the decentralized exchange 510 via a token, such as interacting with the liquidity pool as described with reference to FIG. 4. For example, the decentralized exchange 510 may interact with the liquidity pool 515 via the token in response to the smart contracts 520 verifying that the blockchain address is associated with the one or more attestations at 545. The interaction with the liquidity pool 515 may be an exchange of a first crypto token for a second crypto token according to a radio between the first crypto token and the second crypto token, the ratio associated with the liquidity pool. For example, an algorithm of the liquidity pool 515 (e.g., an AMM algorithm) may determine the ratio.

In some examples, the action may include a removal of a first crypto token or a second crypto token from the liquidity pool 515. For example, the decentralized exchange 510 may remove the first crypto token or the second crypto token from the liquidity pool 515 (e.g., remove liquidity) in response to the smart contracts 520 verifying the sanction status of the blockchain address at 550, such as verifying that the blockchain address is not included on the sanction list.

Alternatively to performing the action at 555, at 560, the decentralized exchange 510 may fail to perform the action. For example, the decentralized exchange 510 may fail to perform the action in response to, such as after or upon, the smart contracts 520 failing to verify that the blockchain address is authorized to perform the action at the decentralized exchange 510.

At 565, the client application 505 may receive an indication of the action. For example, the client application 505 may receive the indication of the action via the decentralized exchange 510. In some examples, the client application 505 may update a user interface based on receiving the indication of the action. As an example, the client application 505 may update the user interface with information associated with the action performed or failed to perform at 555 or 560, respectively.

Figure 6:
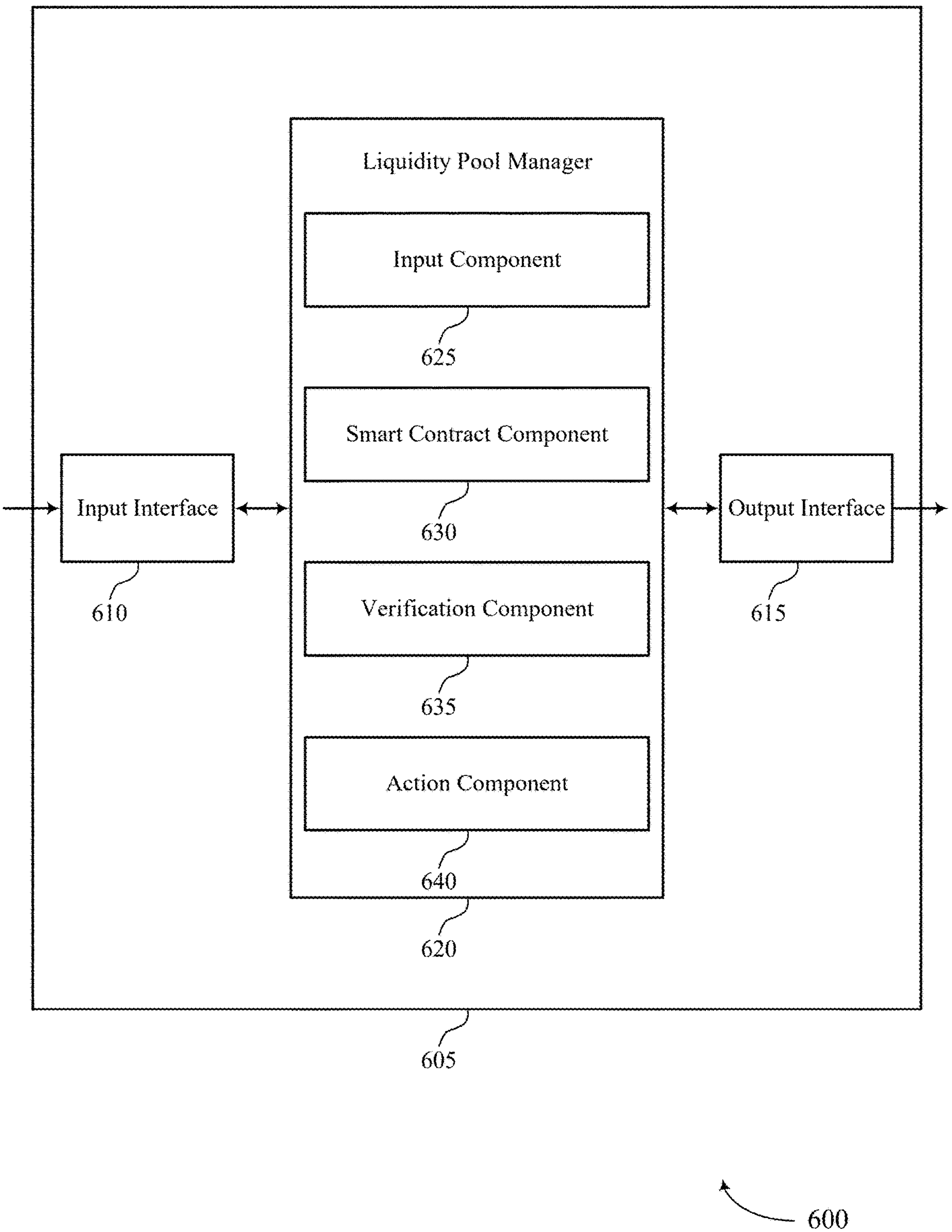
FIG. 6 shows a block diagram of an apparatus that supports user verification hooks for a decentralized exchange in accordance with aspects of the present disclosure.

FIG. 6 shows a block diagram 600 of a system 605 that supports user verification hooks for a decentralized exchange in accordance with aspects of the present disclosure. The system 605 may include an input interface 610, an output interface 615, and a liquidity pool manager 620. The system 605, or one or more components of the system 605 (e.g., the input interface 610, the output interface 615, the liquidity pool manager 620), may include at least one processor, which may be coupled with at least one memory, to support the described techniques. Each of these components may communicate, directly or indirectly, with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, transactions, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the liquidity pool manager 620 to support user verification hooks for a decentralized exchange. In some cases, the input interface 610 may be a component of a network interface 825 as described with reference to FIG. 8.

The output interface 615 may manage output signaling for the system 605. For example, the output interface 615 may receive signaling from other components of the system 605, such as the liquidity pool manager 620, and may transmit such output signaling corresponding to (e.g., representative of or otherwise based on) such signaling to other systems or devices. In some cases, the output interface 615 may be a component of a network interface 825 as described with reference to FIG. 8.

For example, the liquidity pool manager 620 may include an input component 625, a smart contract component 630, a verification component 635, an action component 640, or any combination thereof. In some examples, the liquidity pool manager 620, or various components thereof, may be configured to perform various operations (e.g., receiving, monitoring, transmitting) using or otherwise in cooperation with the input interface 610, the output interface 615, or both. For example, the liquidity pool manager 620 may receive information from the input interface 610, send information to the output interface 615, or be integrated in combination with the input interface 610, the output interface 615, or both to receive information, transmit information, or perform various other operations as described herein.

The liquidity pool manager 620 may support managing a liquidity pool on a decentralized exchange in accordance with examples as disclosed herein. The input component 625 may be configured as or otherwise support a means for receiving, at client application on a user device, an input to perform an action at the decentralized exchange, the input associated with a blockchain address. The smart contract component 630 may be configured as or otherwise support a means for broadcasting, via a blockchain network, one or more messages configured to: cause one or more smart contracts on the blockchain network called by the decentralized exchange to verify whether the blockchain address is authorized to perform the action at the decentralized exchange, wherein verifying includes checking a status managed by an entity different from the decentralized exchange. The verification component 635 may be configured as or otherwise support a means for verifying whether the blockchain address is authorized to perform the action. The one or more messages may be configured to perform, in response to verifying that the blockchain address is authorized to perform the action at the decentralized exchange, the action upon verifying that the blockchain address is authorized to perform the action. Alternatively, the one or more messages may be configured to fail to perform, in response to verifying that the blockchain address is not authorized to perform the action at the decentralized exchange, the action upon failing to verify that the blockchain address is authorized to perform the action. The action component 640 may be configured as or otherwise support a means for performing the action or failing to perform the action.

Figure 7:
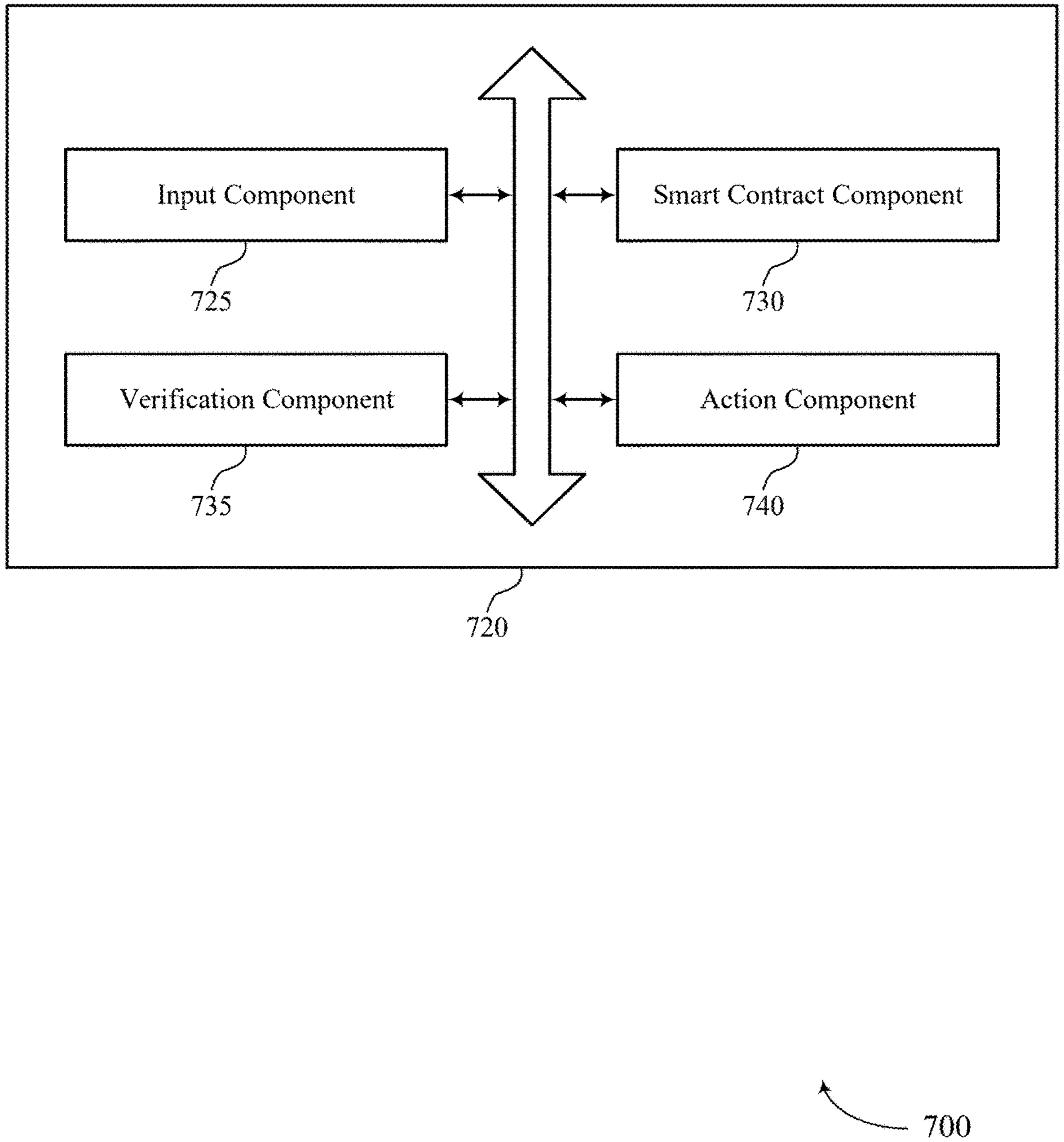
FIG. 7 shows a block diagram of a liquidity pool manager that supports user verification hooks for a decentralized exchange in accordance with aspects of the present disclosure.

FIG. 7 shows a block diagram 700 of a liquidity pool manager 720 that supports user verification hooks for a decentralized exchange in accordance with aspects of the present disclosure. The liquidity pool manager 720 may be an example of aspects of a liquidity pool manager or a liquidity pool manager 620, or both, as described herein. The liquidity pool manager 720, or various components thereof, may be an example of means for performing various aspects of user verification hooks for a decentralized exchange as described herein. For example, the liquidity pool manager 720 may include an input component 725, a smart contract component 730, a verification component 735, an action component 740, or any combination thereof. Each of these components may communicate, directly or indirectly, with one another (e.g., via one or more buses, communications links, communications interfaces, or any combination thereof)

The liquidity pool manager 720 may support managing a liquidity pool on a decentralized exchange in accordance with examples as disclosed herein. The input component 725 may be configured as or otherwise support a means for receiving, at client application on a user device, an input to perform an action at the decentralized exchange, the input associated with a blockchain address. The smart contract component 730 may be configured as or otherwise support a means for broadcasting, via a blockchain network, one or more messages configured to: cause one or more smart contracts on the blockchain network called by the decentralized exchange to verify whether the blockchain address is authorized to perform the action at the decentralized exchange. The verifying may include checking a status managed by an entity different from the decentralized exchange. The one or more messages may be configured to perform, in response to verifying that the blockchain address is authorized to perform the action at the decentralized exchange, the action upon verifying that the blockchain address is authorized to perform the action. Alternatively, the one or more messages may be configured to fail to perform, in response to verifying that the blockchain address is not authorized to perform the action at the decentralized exchange, the action upon failing to verify that the blockchain address is authorized to perform the action. The action component 740 may be configured as or otherwise support a means for performing or failing to perform the action.

In some examples, to support verifying whether the blockchain address is authorized to perform the action at the decentralized exchange, the verification component 735 may be configured as or otherwise support a means for calling the one or more smart contracts to verify whether the blockchain address is whitelisted at the decentralized exchange. In some examples, to support the means for performing the action, the action component 740 may be configured as or otherwise support a means for performing the action comprising initializing the liquidity pool in response to the one or more smart contracts verifying that the blockchain address is whitelisted.

In some examples, to support to support verifying whether the blockchain address is authorized to perform the action at the decentralized exchange, the verification component 735 may be configured as or otherwise support a means for causing the one or more smart contracts to verify whether the blockchain address is associated with one or more attestations managed by the entity different from the decentralized exchange. In some examples, to support the means for performing the action, the action component 740 may be configured as or otherwise support a means for performing the action comprising interacting with the liquidity pool via the token in response to the one or more smart contracts verifying that the blockchain address is associated with the one or more attestations.

In some examples, the one or more attestations are associated with an eligibility of the blockchain address, the one or more attestations comprising a KYC check, a geographic location, a citizenship, or any combination thereof.

In some examples, the one or more smart contracts comprise a policy contract associated with the liquidity pool, the policy contract comprising the one or more attestations associated with an eligibility to interact with the liquidity pool.

In some examples, the one or more smart contracts verify whether the blockchain address is associated with the one or more attestations by referencing a mapping between an attestation record and the blockchain address on the blockchain network.

In some examples, the one or more attestations are issued by the entity different from the decentralized exchange, and causing the one or more smart contracts to verify whether the blockchain address is associated with one or more attestations is based on the entity different from the decentralized exchange issuing the one or more attestations.

In some examples, the action comprises an exchange of a first crypto token for a second crypto token according to a ratio between the first crypto token and the second crypto token, the ratio associated with the liquidity pool.

In some examples, the action comprises an addition of a first crypto token or a second crypto token to the liquidity pool.

In some examples, the action comprises a removal of a first crypto token or a second crypto token from the liquidity pool.

In some examples, causing the one or more smart contracts on the blockchain network called by the decentralized exchange to verify whether the blockchain address is authorized to perform the action comprises verifying whether the blockchain address is listed on a sanction list.

In some examples, cause the decentralized exchange to call the one or more smart contracts comprising the one or more pre-hook contracts, the one or more post-hook contracts, or both on the blockchain network to verify whether the blockchain address is authorized to perform the action.

In some examples, the blockchain address comprises a self-custody address associated with one or more keys managed by the different exchange or managed by a user.

Figure 8:
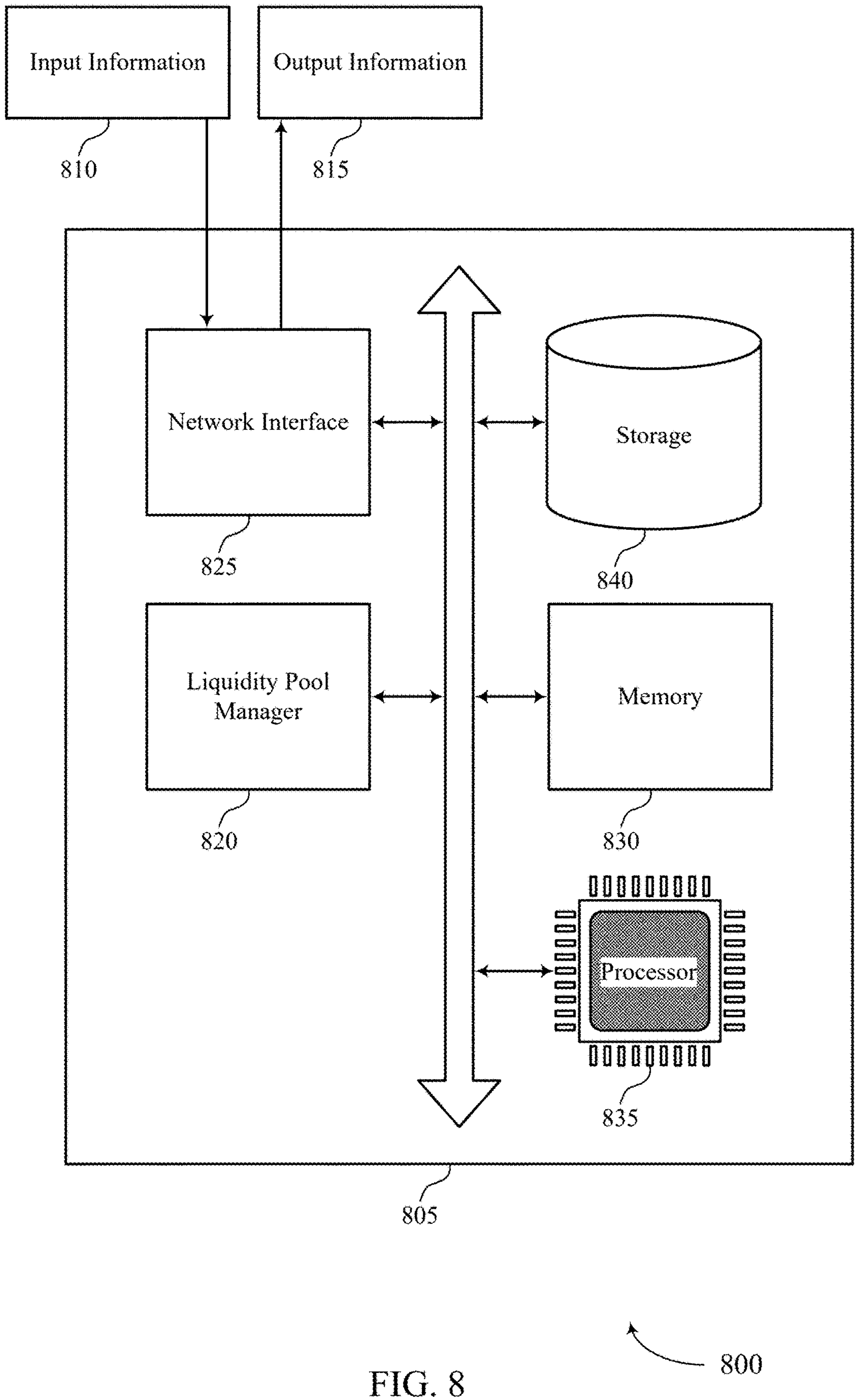
FIG. 8 shows a diagram of a system including a device that supports user verification hooks for a decentralized exchange in accordance with aspects of the present disclosure.

FIG. 8 shows a diagram of a system 800 including a system 805 that supports user verification hooks for a decentralized exchange in accordance with aspects of the present disclosure. The system 805 may be an example of or include components of a system 605 as described herein. The system 805 may include components for data processing, communications, and blockchain access including components for transmitting and receiving communications, such as a liquidity pool manager 820, an input information 810, an output information 815, a network interface 825, at least one memory 830, at least one processor 835, and a storage 840. Each of these components may communicate, directly or indirectly, with one another (e.g., via one or more buses, communications links, communications interfaces, or any combination thereof).

The network interface 825 may enable the system 805 to exchange information (e.g., input information 810, output information 815, or both) with other systems or devices (not shown). For example, the network interface 825 may enable the system 805 to connect to a network (e.g., a network 135 as described herein). The network interface 825 may include one or more wireless network interfaces, one or more wired network interfaces, or any combination thereof.

Memory 830 may include RAM, ROM, or both. The memory 830 may store computer-readable, computer-executable software including instructions that, when executed, cause at least one processor 835 to perform various functions described herein, such as functions supporting user verification hooks for a decentralized exchange. In some cases, the memory 830 may contain, among other things, a basic input/output system (BIOS), which may control basic hardware or software operation such as the interaction with peripheral components or devices. In some cases, the memory 830 may be an example of aspects of one or more components of a custodial token platform 110 as described with reference to FIG. 1. The memory 830 may be an example of a single memory or multiple memories. For example, the system 805 may include one or more memories 830.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in at least one memory 830 to perform various functions (e.g., functions or tasks supporting user verification hooks for a decentralized exchange). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. The processor 835 may be an example of a single processor or multiple processors. For example, the system 805 may include one or more processors 835.

Storage 840 may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1.

The liquidity pool manager 820, which may be an example of aspects of a client application described herein, may support managing a liquidity pool on a decentralized exchange in accordance with examples as disclosed herein. For example, the liquidity pool manager 820 may be configured as or otherwise support a means for receiving, at client application on a user device, an input to perform an action at the decentralized exchange, the input associated with a blockchain address. The liquidity pool manager 820 may be configured as or otherwise support a means for broadcasting, via a blockchain network, one or more messages configured to: cause one or more smart contracts on the blockchain network called by the decentralized exchange to verify whether the blockchain address is authorized to perform the action at the decentralized exchange, where verifying includes checking a status managed by an entity different from the decentralized exchange. The one or more messages may be configured to perform, in response to verifying that the blockchain address is authorized to perform the action at the decentralized exchange, the action upon verifying that the blockchain address is authorized to perform the action. The one or more messages may be configured to fail to perform, in response to verifying that the blockchain address is not authorized to perform the action at the decentralized exchange, the action upon failing to verify that the blockchain address is authorized to perform the action.

By including or configuring the liquidity pool manager 820 in accordance with examples as described herein, the system 805 may support techniques for improved user experience related to liquidity pool interactions, including improved security related to the liquidity pool interactions.

Figure 9:
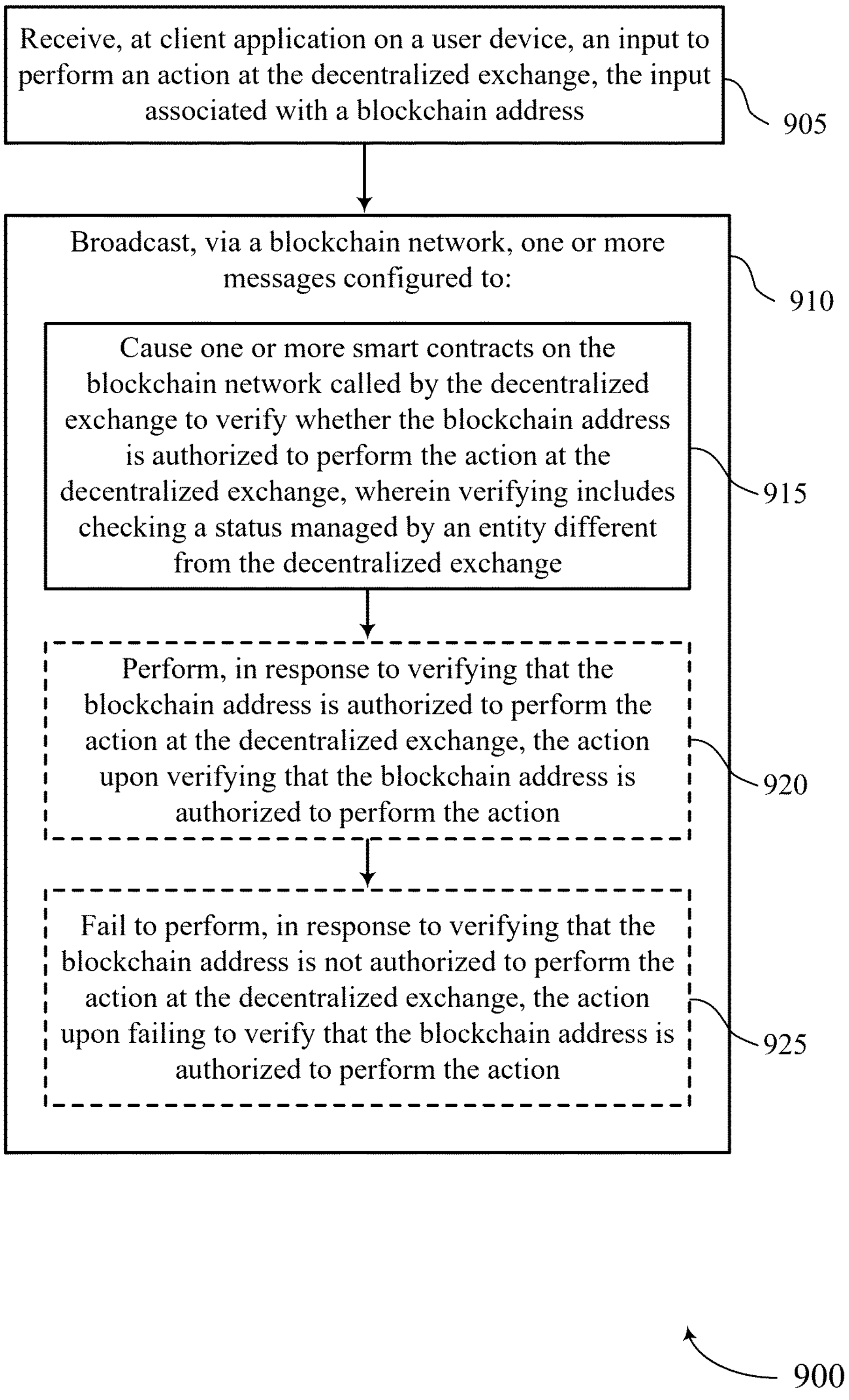
FIGS. 9 and 10 show flowcharts illustrating methods that support user verification hooks for a decentralized exchange in accordance with aspects of the present disclosure.

FIG. 9 shows a flowchart illustrating a method 900 that supports user verification hooks for a decentralized exchange in accordance with aspects of the present disclosure. The operations of the method 900 may be implemented by a custodial token platform or its components as described herein. For example, the operations of the method 900 may be performed by a custodial token platform as described with reference to FIGS. 1 through 8. In some examples, a custodial token platform may execute a set of instructions to control the functional elements of the custodial token platform to perform the described functions. Additionally, or alternatively, the custodial token platform may perform aspects of the described functions using special-purpose hardware.

At 905, the method may include receiving, at client application on a user device, an input to perform an action at the decentralized exchange, the input associated with a blockchain address. The operations of 905 may be performed in accordance with examples as disclosed herein. In some examples, aspects of the operations of 905 may be performed by an input component 725 as described with reference to FIG. 7.

At 910, the method may include broadcasting, via a blockchain network, one or more messages. The one or more messages may be configured to, at 915, cause one or more smart contracts on the blockchain network called by the decentralized exchange to verify whether the blockchain address is authorized to perform the action at the decentralized exchange, wherein verifying includes checking a status managed by an entity different from the decentralized exchange. The operations of 910, 915, or both may be performed in accordance with examples as disclosed herein. In some examples, aspects of the operations of 910, 915, or both may be performed by a smart contract component 730 as described with reference to FIG. 7.

At 920, the one or more messages may be configured to perform, in response to verifying that the blockchain address is authorized to perform the action at the decentralized exchange, the action upon verifying that the blockchain address is authorized to perform the action. The operations of 920 may be performed in accordance with examples as disclosed herein. In some examples, aspects of the operations of 920 may be performed by an action component 740 as described with reference to FIG. 7.

At 925, the one or more messages may be configured to perform, in response to verifying that the blockchain address is not authorized to perform the action at the decentralized exchange, the action upon failing to verify that the blockchain address is authorized to perform the action. For example, the method may include failing to perform the action alternatively or in addition to performing the action at 920. The operations of 925 may be performed in accordance with examples as disclosed herein. In some examples, aspects of the operations of 925 may be performed by an action component 740 as described with reference to FIG. 7.

Figure 10:
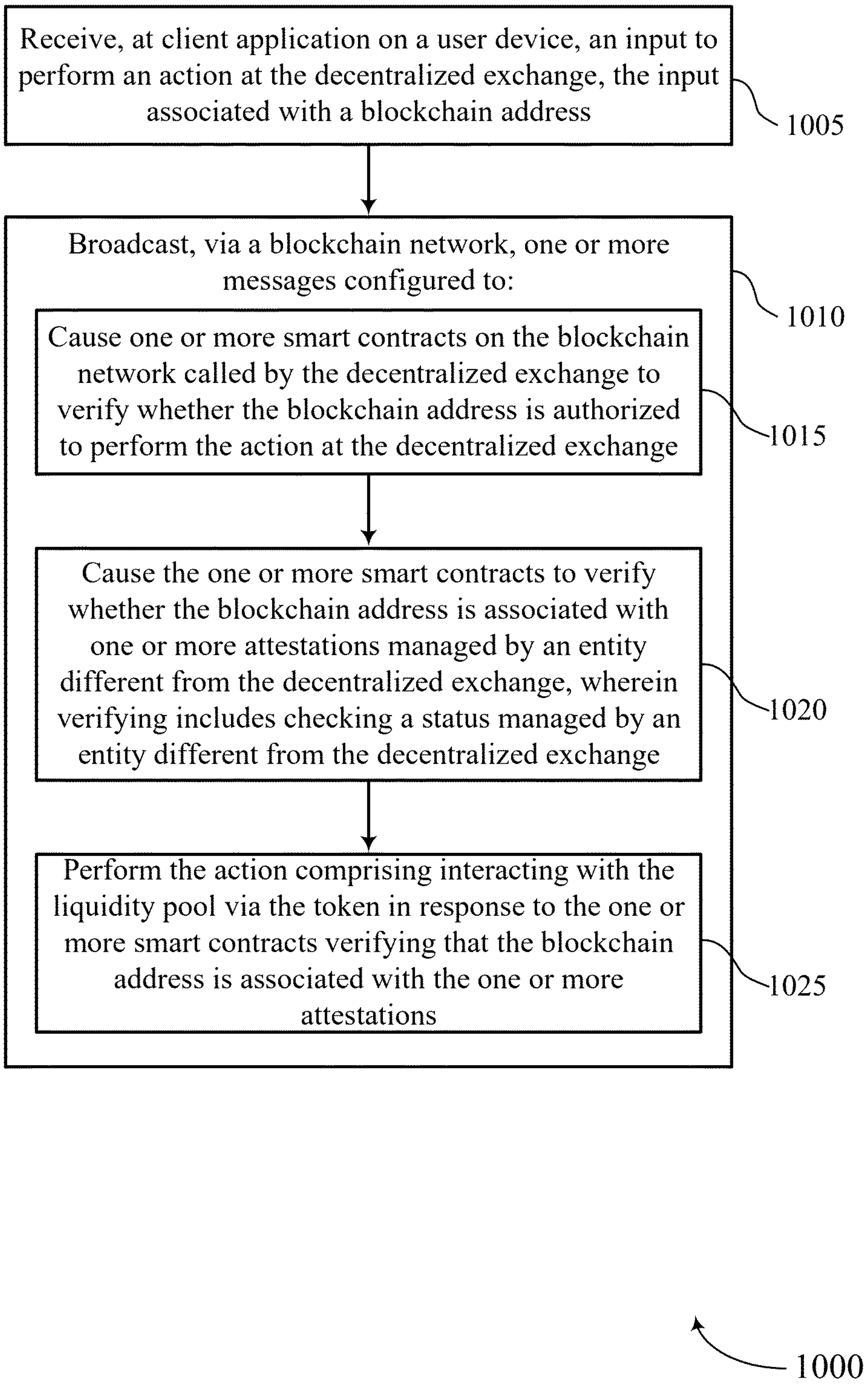

FIG. 10 shows a flowchart illustrating a method 1000 that supports user verification hooks for a decentralized exchange in accordance with aspects of the present disclosure. The operations of the method 1000 may be implemented by a custodial token platform or its components as described herein. For example, the operations of the method 1000 may be performed by a custodial token platform as described with reference to FIGS. 1 through 8. In some examples, a custodial token platform may execute a set of instructions to control the functional elements of the custodial token platform to perform the described functions. Additionally, or alternatively, the custodial token platform may perform aspects of the described functions using special-purpose hardware.

At 1005, the method may include receiving, at client application on a user device, an input to perform an action at the decentralized exchange, the input associated with a blockchain address. The operations of 1005 may be performed in accordance with examples as disclosed herein. In some examples, aspects of the operations of 1005 may be performed by an input component 725 as described with reference to FIG. 7.

At 1010, the method may include broadcasting, via a blockchain network, one or more messages. The one or more messages may be configured to, at 1015, cause one or more smart contracts on the blockchain network called by the decentralized exchange to verify whether the blockchain address is authorized to perform the action at the decentralized exchange. The operations of 1010, 1015, or both may be performed in accordance with examples as disclosed herein. In some examples, aspects of the operations of 1010, 1015, or both may be performed by a smart contract component 730 as described with reference to FIG. 7.

At 1020, the one or more messages may be configured to cause the one or more smart contracts to verify whether the blockchain address is associated with one or more attestations managed by the entity different from the decentralized exchange, wherein verifying includes checking a status managed by an entity different from the decentralized exchange. The operations of 1020 may be performed in accordance with examples as disclosed herein. In some examples, aspects of the operations of 1020 may be performed by a verification component 735 as described with reference to FIG. 7.

At 1025, the one or more messages may be configured to perform the action comprising interacting with the liquidity pool via the token in response to the one or more smart contracts verifying that the blockchain address is associated with the one or more attestations. The operations of 1025 may be performed in accordance with examples as disclosed herein. In some examples, aspects of the operations of 1025 may be performed by an action component 740 as described with reference to FIG. 7.

A method for managing a liquidity pool on a decentralized exchange by an apparatus is described. The method may include receiving, at client application on a user device, an input to perform an action at the decentralized exchange, the input associated with a blockchain address, broadcasting, via a blockchain network, one or more messages configured to cause one or more smart contracts on the blockchain network called by the decentralized exchange to verify whether the blockchain address is authorized to perform the action at the decentralized exchange, wherein verifying includes checking a status managed by an entity different from the decentralized exchange, performing, in response to verifying that the blockchain address is authorized to perform the action at the decentralized exchange, the action upon verifying that the blockchain address is authorized to perform the action, and failing to perform, in response to verifying that the blockchain address is not authorized to perform the action at the decentralized exchange, the action upon failing to verify that the blockchain address is authorized to perform the action.

An apparatus for managing a liquidity pool on a decentralized exchange is described. The apparatus may include one or more memories storing processor executable code, and one or more processors coupled with the one or more memories. The one or more processors may individually or collectively be operable to execute the code to cause the apparatus to receive, at client application on a user device, an input to perform an action at the decentralized exchange, the input associated with a blockchain address, broadcast, via a blockchain network, one or more messages configured to cause one or more smart contracts on the blockchain network called by the decentralized exchange to verify whether the blockchain address is authorized to perform the action at the decentralized exchange, wherein verifying include checking a status managed by an entity different from the decentralized exchange, perform, in response to verifying that the blockchain address is authorized to perform the action at the decentralized exchange, the action upon verifying that the blockchain address is authorized to perform the action, and fail to perform, in response to verifying that the blockchain address is not authorized to perform the action at the decentralized exchange, the action upon failing to verify that the blockchain address is authorized to perform the action.

Another apparatus for managing a liquidity pool on a decentralized exchange is described. The apparatus may include means for receiving, at client application on a user device, an input to perform an action at the decentralized exchange, the input associated with a blockchain address, means for broadcasting, via a blockchain network, one or more messages configured to cause one or more smart contracts on the blockchain network called by the decentralized exchange to verify whether the blockchain address is authorized to perform the action at the decentralized exchange, wherein verifying includes checking a status managed by an entity different from the decentralized exchange, means for performing, in response to verifying that the blockchain address is authorized to perform the action at the decentralized exchange, the action upon verifying that the blockchain address is authorized to perform the action, and means for failing to perform, in response to verifying that the blockchain address is not authorized to perform the action at the decentralized exchange, the action upon failing to verify that the blockchain address is authorized to perform the action.

A non-transitory computer-readable medium storing code for managing a liquidity pool on a decentralized exchange is described. The code may include instructions executable by one or more processors to receive, at client application on a user device, an input to perform an action at the decentralized exchange, the input associated with a blockchain address, broadcast, via a blockchain network, one or more messages configured to cause one or more smart contracts on the blockchain network called by the decentralized exchange to verify whether the blockchain address is authorized to perform the action at the decentralized exchange, wherein verifying include checking a status managed by an entity different from the decentralized exchange, perform, in response to verifying that the blockchain address is authorized to perform the action at the decentralized exchange, the action upon verifying that the blockchain address is authorized to perform the action, and fail to perform, in response to verifying that the blockchain address is not authorized to perform the action at the decentralized exchange, the action upon failing to verify that the blockchain address is authorized to perform the action.

In some examples of the method, apparatus, and non-transitory computer-readable medium described herein, and the method, apparatuses, and non-transitory computer-readable medium may include further operations, features, means, or instructions for cause the one or more smart contracts to verify whether the blockchain address may be whitelisted at the decentralized exchange and perform the action comprising initializing the liquidity pool in response to the one or more smart contracts verifying that the blockchain address may be whitelisted.

In some examples of the method, apparatus, and non-transitory computer-readable medium described herein, and the method, apparatuses, and non-transitory computer-readable medium may include further operations, features, means, or instructions for cause the one or more smart contracts to verify whether the blockchain address may be associated with one or more attestations managed by the entity different from the decentralized exchange and perform the action comprising interacting with the liquidity pool via the token in response to the one or more smart contracts verifying that the blockchain address may be associated with the one or more attestations.

In some examples of the method, apparatus, and non-transitory computer-readable medium described herein, the one or more attestations may be associated with an eligibility of the blockchain address, the one or more attestations comprising a KYC check, a geographic location, a citizenship, or any combination thereof.

In some examples of the method, apparatus, and non-transitory computer-readable medium described herein, the one or more smart contracts comprise a policy contract associated with the liquidity pool, the policy contract comprising the one or more attestations associated with an eligibility to interact with the liquidity pool.

In some examples of the method, apparatus, and non-transitory computer-readable medium described herein, the one or more smart contracts verify whether the blockchain address may be associated with the one or more attestations by referencing a mapping between an attestation record and the blockchain address on the blockchain network.

In some examples of the method, apparatus, and non-transitory computer-readable medium described herein, the one or more attestations are issued by the entity different from the decentralized exchange, and causing the one or more smart contracts to verify whether the blockchain address is associated with one or more attestations is based on the entity different from the decentralized exchange issuing the one or more attestations.

In some examples of the method, apparatus, and non-transitory computer-readable medium described herein, the action comprises an exchange of a first crypto token for a second crypto token according to a ratio between the first crypto token and the second crypto token, the ratio associated with the liquidity pool.

In some examples of the method, apparatus, and non-transitory computer-readable medium described herein, the action comprises an addition of a first crypto token or a second crypto token to the liquidity pool.

In some examples of the method, apparatus, and non-transitory computer-readable medium described herein, the action comprises a removal of a first crypto token or a second crypto token from the liquidity pool.

Some examples of the method, apparatus, and non-transitory computer-readable medium described herein may further include operations, features, means, or instructions for causing the one or more smart contracts on the blockchain network called by the decentralized exchange to verify whether the blockchain address may be authorized to perform the action comprises verifying whether the blockchain address may be listed on a sanction list.

Some examples of the method, apparatus, and non-transitory computer-readable medium described herein may further include operations, features, means, or instructions for cause the decentralized exchange to call the one or more smart contracts comprising the one or more pre-hook contracts, the one or more post-hook contracts, or both on the blockchain network to verify whether the blockchain address may be authorized to perform the action.

In some examples of the method, apparatus, and non-transitory computer-readable medium described herein, the blockchain address comprises a self-custody address associated with one or more keys managed by the different exchange or managed by a user.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for managing a liquidity pool on a decentralized exchange, comprising:

receiving, at a client application on a user device, an input to perform an action at the decentralized exchange, the input associated with a blockchain address;

performing, via a pre-hook contract configured at the liquidity pool, before execution of a function, at the decentralized exchange, associated with the action and called by one or more messages broadcast via a blockchain network after receiving the input, a verification of an authorization of interaction with the liquidity pool via the blockchain network by the blockchain address, wherein performing the verification includes checking, by the pre-hook contract, a status of the blockchain address that corresponds to the action, the status managed by an entity different from the decentralized exchange; and executing, based at least in part on the one or more messages and in response to a successful verification of the authorization of interaction with the liquidity pool via the blockchain network by the blockchain address, the function associated with the action.

2. The method of claim 1, wherein the action comprises initializing the liquidity pool, and wherein performing the verification comprises:

verifying, by the pre-hook contract, whether the blockchain address is whitelisted at the decentralized exchange, wherein executing the function associated with the action is in response to verifying that the blockchain address is whitelisted.

3. The method of claim 1, wherein the input to perform the action comprises an input to interact with the liquidity pool on the decentralized exchange via a token, and wherein performing the verification comprises:

verifying, via the pre-hook contract, whether the blockchain address is associated with one or more attestations managed by the entity different from the decentralized exchange, wherein executing the function associated with the action comprising interacting with the liquidity pool via the token is in response to verifying that the blockchain address is associated with the one or more attestations.

4. The method of claim 3, wherein the one or more attestations are associated with an eligibility of the blockchain address, the one or more attestations comprising a know-your-customer (KYC) check, a geographic location, a citizenship, or any combination thereof.

5. The method of claim 3, wherein the pre-hook contract may call a policy contract associated with the liquidity pool, the policy contract comprising the one or more attestations associated with an eligibility to interact with the liquidity pool.

6. The method of claim 3, wherein verifying whether the blockchain address is associated with the one or more attestations is based at least in part on referencing a mapping between an attestation record and the blockchain address on the blockchain network.

7. The method of claim 3, wherein the one or more attestations are issued by the entity different from the decentralized exchange, and wherein the verification is based at least in part on the entity different from the decentralized exchange issuing the one or more attestations.

8. The method of claim 1, wherein the action comprises an exchange of a first crypto token for a second crypto token according to a ratio between the first crypto token and the second crypto token, the ratio associated with the liquidity pool.

9. The method of claim 1, wherein the action comprises an addition of a first crypto token or a second crypto token to the liquidity pool.

10. The method of claim 1, wherein the action comprises a removal of a first crypto token or a second crypto token from the liquidity pool.

11. The method of claim 10, wherein performing the verification comprises:

verifying whether the blockchain address is listed on a sanction list.

12. The method of claim 1, further comprising:

performing, via a post-hook contract configured at the liquidity pool and based at least in part on execution of the function associated with the action, one or more fee payment procedures.

13. The method of claim 1, wherein the blockchain address comprises a self-custody address associated with one or more keys managed by a different exchange or managed by a user.

14. An apparatus for managing a liquidity pool on a decentralized exchange, comprising:

one or more memories storing processor-executable code; and one or more processors coupled with the one or more memories and individually or collectively operable to execute the code to cause the apparatus to:

receive, at a client application on a user device, an input to perform an action at the decentralized exchange, the input associated with a blockchain address;

perform, via a pre-hook contract configured at the liquidity pool, before execution of a function, at the decentralized exchange, associated with the action and called by one or more messages broadcast via a blockchain network after receiving the input, a verification of an authorization of interaction with the liquidity pool via the blockchain network by the blockchain address, wherein performing the verification includes checking, by the pre-hook contract, a status of the blockchain address that corresponds to the action, the status managed by an entity different from the decentralized exchange; and execute, based at least in part on the one or more messages and in response to a successful verification of the authorization of interaction with the liquidity pool via the blockchain network by the blockchain address, the function associated with the action.

15. The apparatus of claim 14, wherein the action comprises initializing the liquidity pool, and wherein, to perform the verification, the one or more processors are individually or collectively operable to execute the code to cause the apparatus to:

verify, by the pre-hook contract, whether the blockchain address is whitelisted at the decentralized exchange, wherein executing the function associated with the action is in response to verifying that the blockchain address is whitelisted.

16. The apparatus of claim 14, wherein the input to perform the action comprises an input to interact with the liquidity pool on the decentralized exchange via a token, and wherein, to perform the verification, the one or more processors are individually or collectively operable to execute the code to cause the apparatus to:

verify, via the pre-hook contract, whether the blockchain address is associated with one or more attestations managed by the entity different from the decentralized exchange, wherein executing the function associated with the action comprising interacting with the liquidity pool via the token is in response to verifying that the blockchain address is associated with the one or more attestations.

17. The apparatus of claim 16, wherein the one or more attestations are associated with an eligibility of the blockchain address, the one or more attestations comprising a know-your-customer (KYC) check, a geographic location, a citizenship, or any combination thereof.

18. A non-transitory computer-readable medium storing code for managing a liquidity pool on a decentralized exchange, the code comprising instructions executable by one or more processors to:

receive, at a client application on a user device, an input to perform an action at the decentralized exchange, the input associated with a blockchain address;

perform, via a pre-hook contract configured at the liquidity pool, before execution of a function, at the decentralized exchange, associated with the action and called by one or more messages broadcast via a blockchain network after receiving the input, a verification of an authorization of interaction with the liquidity pool via the blockchain network by the blockchain address, wherein performing the verification includes checking, by the pre-hook contract, a status of the blockchain address that corresponds to the action, the status managed by an entity different from the decentralized exchange; and execute, based at least in part on the one or more messages and in response to a successful verification of the authorization of interaction with the liquidity pool via the blockchain network by the blockchain address, the function associated with the action.

19. The non-transitory computer-readable medium of claim 18, wherein the action comprises initializing the liquidity pool, and wherein, to perform the verification, the code is executable by the one or more processors to:

verify, by the pre-hook contract, whether the blockchain address is whitelisted at the decentralized exchange, wherein executing the function associated with the action is in response to verifying that the blockchain address is whitelisted.

20. The non-transitory computer-readable medium of claim 18, wherein the input to perform the action comprises an input to interact with the liquidity pool on the decentralized exchange via a token, and, to perform the verification, the code is executable by the one or more processors to:

verify, via the pre-hook contract, whether the blockchain address is associated with one or more attestations managed by the entity different from the decentralized exchange, wherein executing the function associated with the action comprising interacting with the liquidity pool via the token is in response to verifying that the blockchain address is associated with the one or more attestations.

* * * * *